United States Patent Office 3,212,456
Patented Oct. 19, 1965

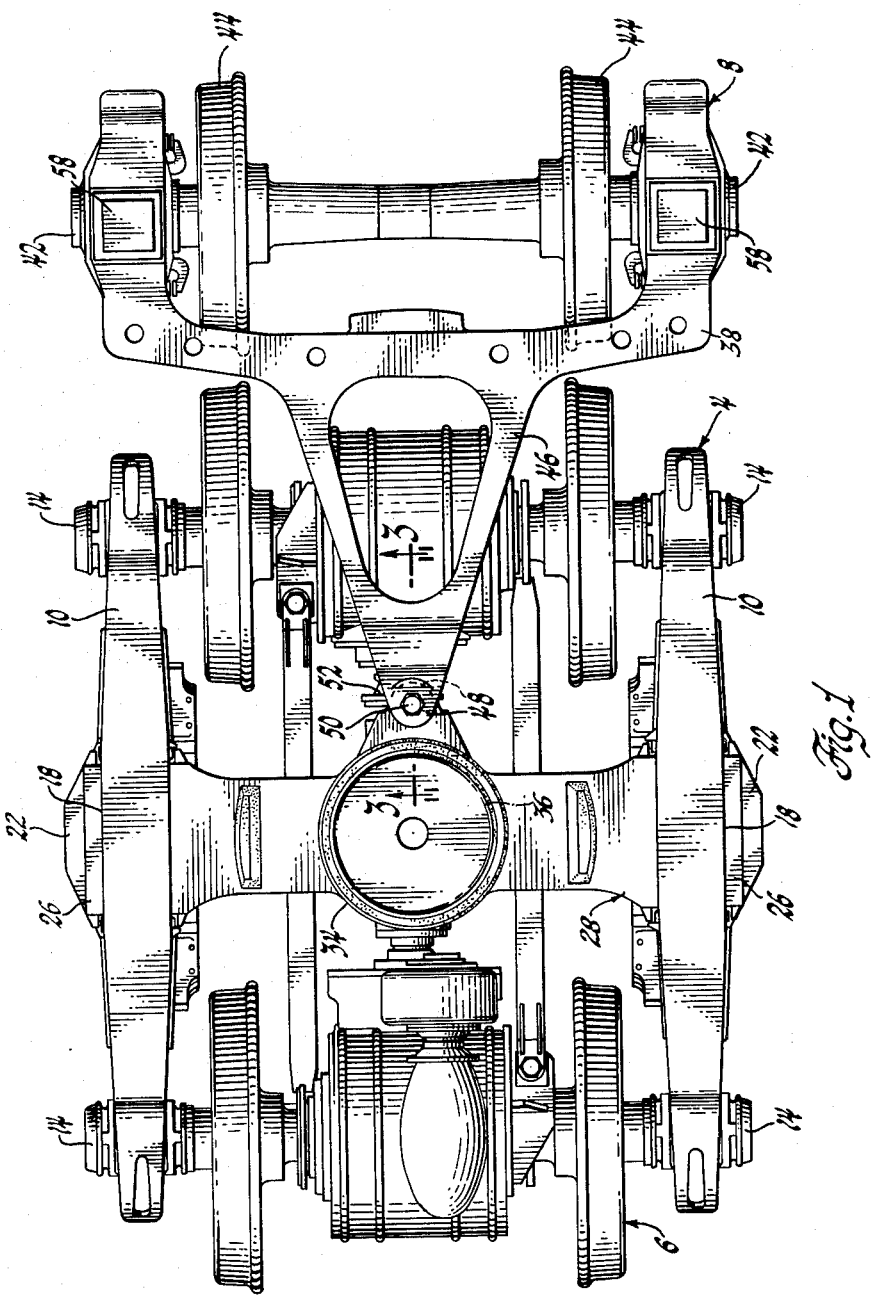

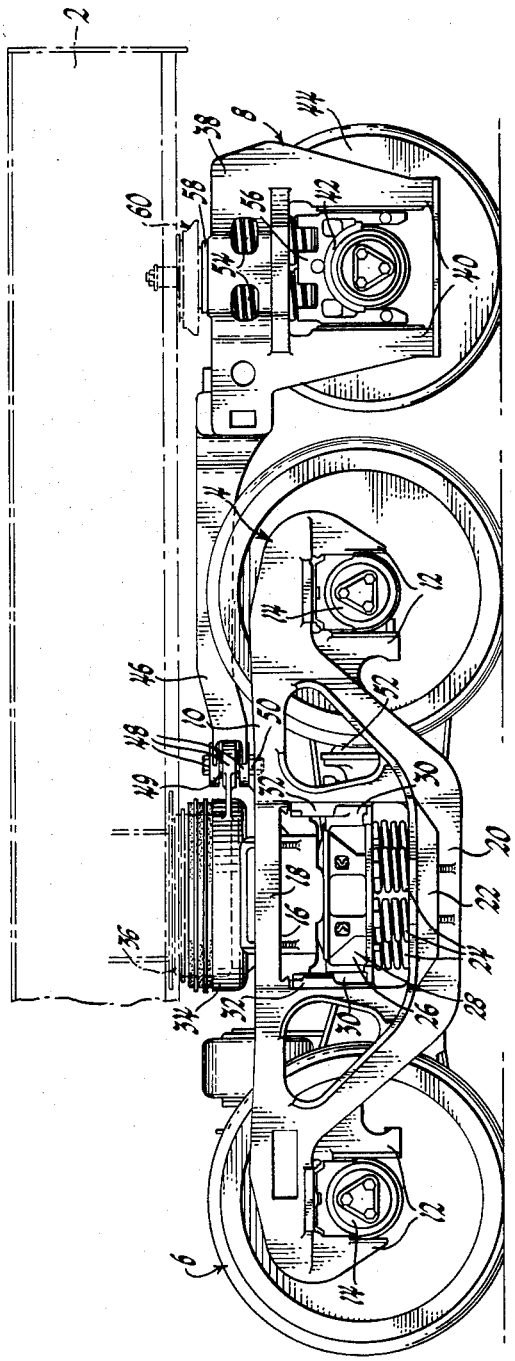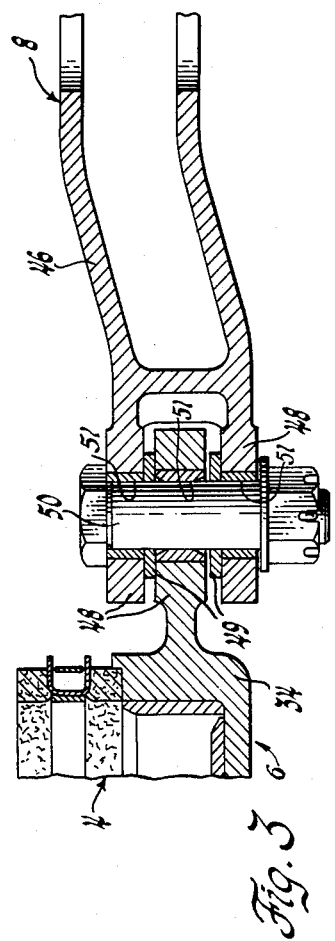

3,212,456
ARTICULATED TRUCK
Thomas B. Dilworth, Hinsdale, and Ludvik F. Koci, Downers Grove, Ill., assignors to General Motors Corporation, Detroit, Mich., a corporation of Delaware
Filed Oct. 17, 1962, Ser. No. 231,076
3 Claims. (Cl. 105—196)

This invention relates generally to railway vehicle trucks and particularly to locomotive trucks in which it is desired to decrease the axle loading thereof without changing the basic nature of the truck assembly. This has been accomplished by the present invention which involves the modification of a more or less conventional truck by the addition of an auxiliary truck portion arranged so that the truck may be disassembled readily for easy maintenance and repair.

For a further understanding of the invention and the objects thereof, reference may be made to the following detailed description taken in conjunction with the drawings in which:

FIGURE 1 is a plan view of the unique truck assembly.

FIGURE 2 is an elevational view of a railway vehicle including the unique truck for supporting one end of the body thereof.

FIGURE 3 is an enlarged view with portions broken away and in section taken substantially on the line 3—3 of FIGURE 1 illustrating the details of the pivotal connection between the bolster of the main truck portion and the tonque of the auxiliary truck portion.

Referring now particularly to FIGURES 1 and 2, a railway vehicle is shown which includes a body and underframe 2 and a supporting truck assembly indicated generally by a numeral 4. The truck assembly 4 includes a main truck portion indicated generally by a numeral 6 and an auxiliary truck portion indicated generally by a numeral 8. The main truck portion includes the usual transversely spaced longitudinally extending side frame members 10, downwardly extending pedestals 12 on side frames 10, and journal box and wheel and axle sets 14. The transversely spaced side frames 10 include a window 16 therein formed by upper compression and lower tension pieces 18 and 20, respectively. Formed on tension pieces 20 are spring seats 22 which accommodate the lower ends of sets of coil springs 24, in turn supporting opposite ends 26 of a sprung bolster 28. The bolster ends of bolster 28 include guide tabs 30 engaging the edges 32 forming the sides of the window 16 in frames 10 to thereby maintain tram between the side frames. The upper side of the bolster 28 has thereon a kingpin bearing well 34 in which is received a kingpin 36 fixed to the underside of the underframe of the railway vehicle body 2. The main portion 6 of truck assembly 4 thus supports the underframe of the body 2 and is adapted to pivot thereunder by reason of the kingpin 36 and well 34.

Because of the need for reducing axle loadings, the main portion 6 of truck assembly 4, which is more or less typical of a conventional truck assembly, has been uniquely modified by the addition of the auxiliary portion 8. This auxiliary portion 8 comprises an auxiliary truck frame 38 which is in the nature of a yoke extending transversely and having downwardly depending pedestals 40 thereon embracing the journal boxes 42 in which are received the ends of wheel and axle sets 44. The auxiliary frame 38 also includes, rigid therewith, a tongue section or piece 46 which is pivotally fastened to the well 34 of bolster 28 by the nested bosses 48, shims 49 and stud 50 (see FIGURE 3). Bearing surfaces 51 are provided about stud 50 within the nested bosses 48 to facilitate pivotal motion between auxiliary portion 8 and main portion 6. It is to be noted that the tongue 46 passes over the top of one of the wheel and axle assemblies 14 thus enabling such wheel and axle assembly to be dropped along with the associated traction motor 52 supported on the axle of set 14 and truck frame 10 for easy bench maintenance thereof.

Returning to the auxiliary truck frame 38 for a moment, it may be observed that the underside thereof forms an upper spring seat for sets of coil springs 54 whose lower ends are seated in spring seats 56 on the upper sides of the journal box assemblies 42. There are transversely spaced flat surfaced supporting pads 58 located on the upper sides of the auxiliary frame 38. These supporting pads are adapted to engage the underside of the railway vehicle body 2 to thereby assist in supporting the end of the railway vehicle body 2. These pads, however, must move laterally relative to the underside of the railway vehicle because the truck in following the curvatures of the track does not remain in alignment at all times with the vehicle body. In order to achieve proper loading of these supports 58, however, it is necessary that the cooperating surface on the underside of the vehicle body 2 be in alignment therewith. For this reason adjustable leveling pads have been provided which are indicated generally by a numeral 60.

This unique railway vehicle truck assembly operates as follows: As the load is applied to the truck assembly by the end of the railway vehicle 2, the load is distributed via the kingpin 36 and the adjustable pads 60 to the bolster 28 of the main truck portion 6 and to the auxiliary truck frame 38, respectively. The load on the bolster 28 and truck frame 38 is then distributed via the spring sets 24 and 54 and side frame members 10 to the three wheel and axle sets of the truck assembly. As previously emphasized, the auxiliary truck frame is made so that the tongue 46 thereof extends over the top of one of the wheel and axle sets so that such wheel and axle set may be removed along with the traction motor partially supported thereon for easy maintenance and repair. The auxiliary truck portion 8 can swing laterally about its pivot assembly formed by the bosses 48, etc., to conform to the curvature of the track. Such movement, however, is damped by the sliding friction between the plates 58 and the adjustment pads 60. It is to be noted that the sets of springs 54 and 24 provide for vertical deflection of the end of the vehicle 2.

We claim:

1. A railway vehicle truck assembly comprising a pair of transversely spaced longitudinally extending side frame members, transversely spaced spring assemblies mounted on said side frames, a transversely extending bolster supported on said springs for vertical movement with respect to said side frames and a pair of longitudinally spaced wheel and axle sets supporting the ends of said side frame members, the ends of said bolster having guide members cooperating with said side frame members to maintain tram therebetween, an auxiliary truck frame having a tongue extending over one of said wheel and axle sets and pivotally connected to said bolster intermediate the ends thereof, an auxiliary wheel and axle set longitudinally spaced from the other of said wheel and axle sets on which are mounted transversely spaced spring assemblies supporting said auxiliary frame, and longitudinally spaced means on both said bolster and said auxiliary frame adapted to receive and directly support a railway vehicle body for pivotal and sliding movement relative thereto.

2. A railway vehicle truck assembly comprising a pair of transversely spaced longitudinally extending side frame members, transversely spaced spring assemblies mounted on said side frame members, a transversely extending bolster supported on said spring assemblies for vertical movement with respect to said side frame members, a pair of longitudinally spaced wheel and axle sets supporting the ends of said side frame members, an auxiliary truck frame having a tongue extending over one of said wheel and axle sets and pivotally connected to said bolster intermediate the ends thereof, an auxiliary wheel and axle set longitudinally spaced from the other of said wheel and axle sets on which are mounted transversely spaced spring assemblies supporting said auxiliary frame, kingpin means on said bolster adapted to receive and directly support a railway vehicle body for pivotal movement relative thereto, and flat surfaced supporting pad means on said auxiliary frame adapted to receive and directly support a railway vehicle body for sliding movement relative thereto.

3. A railway vehicle truck assembly comprising a pair of transversely spaced longitudinally extending side frame members, transversely spaced spring assemblies, mounted on said side frame members, a transversely extending bolster supported on said spring assemblies for vertical movement with respect to said side frame members, a pair of longitudinally spaced wheel and axle sets supporting the ends of said side frame members, an auxiliary truck frame having a tongue extending over one of said wheel and axle sets and pivotally connected to said bolster intermediate the ends thereof, an auxiliary wheel and axle set longitudinally spaced from the other of said wheel and axle sets on which are mounted transversely spaced spring assemblies supporting said auxiliary frame, kingpin means on said bolster adapted to receive and directly support a railway vehicle body for pivotal movement relative thereto, and supporting pads on said auxiliary frame transversely spaced above said auxiliary wheel and axle set and adapted to receive and directly support a railway vehicle body for sliding movement relative thereto.

References Cited by the Examiner
UNITED STATES PATENTS

| | | | |
|---|---|---|---|
| 520,111 | 5/94 | Hunter | 105—175 X |
| 1,151,471 | 8/15 | Kadel | 105—196 |
| 1,219,647 | 3/17 | Lake | 105—183 X |
| 1,331,887 | 2/20 | Van Kyke | 105—199 X |
| 1,466,590 | 8/23 | Kelley | 105—199 |
| 1,502,988 | 7/24 | Goodwin | 105—195 |
| 1,503,847 | 8/24 | Pilcher | 105—195 |
| 1,513,399 | 10/24 | Knox | 105—195 |
| 1,682,517 | 8/28 | Houston | 105—175 |
| 1,953,401 | 4/34 | Giger | 105—175 |
| 2,107,841 | 2/38 | Seider | 105—175 |
| 2,196,007 | 4/40 | Blunt | 105—196 X |
| 2,703,057 | 3/55 | Wintemberg | 105—199 X |

MILTON BUCHLER, *Primary Examiner.*
LEO QUACKENBUSH, *Examiner.*